United States Patent [19]

Rathje

[11] 4,313,076
[45] Jan. 26, 1982

[54] DYNAMOELECTRIC MACHINE, METHOD OF OPERATING SUCH, AND CIRCUIT

[75] Inventor: William C. Rathje, Clinton, Iowa

[73] Assignee: General Electric Company, Fort Wayne, Ind.

[21] Appl. No.: 152,755

[22] Filed: May 23, 1980

[51] Int. Cl.³ .............................................. H02P 1/44
[52] U.S. Cl. .................................. 318/790; 318/785; 318/797; 318/425; 318/525; 310/198
[58] Field of Search ............... 318/785, 784, 786, 787, 318/788, 789, 790, 793, 796, 797, 816, 817, 523, 524, 525, 351, 424, 425; 310/198, 140

[56] References Cited

U.S. PATENT DOCUMENTS

| | | | |
|---|---|---|---|
| 1,912,337 | 5/1933 | Kennedy | 318/817 |
| 3,348,109 | 10/1967 | Wright | 318/807 |
| 4,063,135 | 12/1977 | Wanlass | 318/795 |
| 4,107,583 | 8/1978 | Houtman | 318/724 |
| 4,152,630 | 5/1979 | Wanlass | 318/796 |

*Primary Examiner*—David Smith, Jr.
*Attorney, Agent, or Firm*—Joseph E. Papin

[57] ABSTRACT

A dynamoelectric machine having a low A ratio during its starting mode and a high A ratio during its running mode. During the starting mode of the dynamoelectric machine, an auxiliary winding serially connected in bucking relation with a phase winding is excited therewith across a main winding. Generally as the dynamoelectric machine is energized to a predetermined speed indicative of the occurrence of its running mode, the phase winding and the bucking auxiliary winding are electrically disassociated, and another auxiliary winding serially connected and arranged in additive relation with the phase winding is excited therewith across the main winding.

A method of operating a dynamoelectric machine and a circuit are also disclosed.

23 Claims, 8 Drawing Figures

DYNAMOELECTRIC MACHINE, METHOD OF OPERATING SUCH, AND CIRCUIT

FIELD OF THE INVENTION

This invention relates generally to dynamoelectric machines and in particular to those of the resistance start capacitor run type, a method of operating such dynamoelectric machines, and a circuit.

BACKGROUND OF THE INVENTION

In the past, dynamoelectric machines or electric motors of the resistance start induction run type, also known as resistance split phase motors, were utilized in a plurality of different applications and environments, such as for instance in furnaces, pumps, dehumidifiers, or the like and also in a hermetic environment for driving compressors of refrigerators or freezers or the like. While these past resistance split phase motors utilized a plurality of different winding circuits, a typical winding circuit included a main winding and a phase winding concurrently excited during a starting mode or energization of such a motor, and generally as the motor attained a predetermined running speed therefor, the phase winding was switched or otherwise electrically disassociated from the winding circuit by suitable means, such as for instance a current relay, a voltage relay or a centrifugal switch or the like.

These past resistance split phase motors generally utilized the resistance of the phase winding to achieve a desired current phase displacement between the current of the main winding and the current of the phase winding for effecting the starting mode of the motor. The necessary resistance to effect phase displacement was often achieved by providing both the main winding and the phase winding with a plurality of coils with each such coil comprising a predetermined number of forward conductor turns distributed in selected winding slots in a magnetic core of the motor, and in addition, an auxiliary winding having a plurality of conductor turns in a direction reverse from those of the phase winding was connected in circuit relation therewith. The magnetic field effected by the reverse wound turns as essentially cancelled by the magnetic field effected by corresponding effective forward wound turns in the phase winding.

In some of the winding circuits of the past resistance split phase motors, the above mentioned magnetic field cancelling effect was achieved by winding the phase winding in two parts and then connecting the two parts in the winding circuit so that the magnetic fields produced thereby were in a bucking relation. From the standpoint of terminology, subsequent discussion of reverse turns or reverse wound coils is intended to mean either turns or coils formed by winding in a direction opposite the forward wound coils of the phase winding, or turns or coils which are wound in the same direction but connected such that the direction of current flow therethrough is opposite the direction of current flow through the phase winding in a manner so as to produce bucking magnetic fields.

Because of the recent electrical energy shortage as well as the concomitant sharp increase in the cost of electrical energy, much more attention has been directed toward energy conservation, and increased efforts have been made to improve motor efficiencies with much of the effort being directed toward the design of capacitor run motors for applications in which the past resistance split phase motors have been used previously. Although capacitor run motors may effect an increase in operating efficiency, it is believed that one of the disadvantageous or undesirable features of such capacitor run motors is that the design and manufacture thereof may represent a considerable added expense in comparison with the past resistance split phase motors thereby limiting the applications where such capacitor run motors are economically feasible. For instance, it is believed that the economic feasibility of utilizing a capacitor run motor in lieu of a resistance split phase motor may be especially limited in situations where such capacitor run motor was designed to approach balanced operation in order to optimize operating efficiency. Furthermore, another disadvantageous or undesirable feature of the capacitor run motors is believed to be that at least some thereof may encounter problems resulting from low starting torque.

Efforts have been made in the past to broaden the range of applicability of capacitor run motors by developing starting arrangements to increase their starting torque. For example, externally connected resistors have been connected in series with the phase winding of the capacitor run motors, and a relay was utilized for disconnecting such externally mounted resistors during the running mode of the capacitor run motors.

As discussed previously, some resistance split phase motors were fabricated with a phase winding resistance which is achieved by associating a phase winding having forward conductor turns with an auxiliary winding having backward wound conductor turns, or by providing a two part phase winding wherein the respective parts were wound and disposed on the magnetic core such that their respective magnetic fields were in a bucking relation. However, the backward wound or disposed turns must either be removed from the winding circuit of the motor during the run condition or else a relatively large run capacitor must be utilized in order to improve motor operating efficiency.

One known approach for partially solving at least some of the previously discussed problems associated with the use of a phase winding having a reverse wound or disposed portion in a capacitor run motor is disclosed in U.S. Pat. No. 4,107,583, issued Aug. 15, 1978 to Jack A. Houtman which is incorporated herein by reference. This patent discloses, among other things, a connection arrangement wherein a reverse wound or disposed portion of a phase winding is disconnected during the running condition of the motor, thereby improving motor operating efficiency while obtaining a relatively high starting torque for the motor.

Another resistance split motor of the capacitor run variety is the subject of copending patent application Ser. No. 152,754 filed May 23, 1980 in the name of J. H. Johnson which is also incorporated herein by reference. In this motor, a phase winding and an auxiliary winding are disposed on a magnetic core of the motor, and a current relay reverses the manner in which the auxiliary winding is connected in series with the phase winding. During a starting mode or operation of the motor, the auxiliary winding is connected in series with the phase winding in such a manner that the magnetic field produced thereby is in bucking magnetic relation to the magnetic field produced by the phase winding. This increases the resistance of the combined windings and facilitates starting of the motor. During a running mode or operation of the motor, the connection of the auxiliary winding is reversed such that current flow therethrough establishes a magnetic field which is in an aiding or additive relation to the magnetic field produced by the phase winding. Thus, both the auxiliary and phase windings are utilized during the running mode of the motor to improve operating efficiency.

Although a reversible auxiliary winding has many salient features and manifestly is advantageous from the standpoint of efficient use of the winding because it functions in both the start and running modes, it is believed that a motor designer may often be faced with the necessity of compromising either starting or running torque, or both. For instance, if the auxiliary winding is chosen so that starting torque is optimized, then running torque may likely be somewhat less than optimum because the freedom of selection of the running auxiliary winding is no longer present. Conversely, if the auxiliary winding is chosen for optimum running torque, then starting torque may be compromised.

SUMMARY OF THE INVENTION

Among the several objects of the present invention may be noted the provision of an improved dynamoelectric machine, an improved method of operating the dynamoelectric machine, and an improved circuit which overcome the above discussed disadvantageous or undesirable features, as well as others, of the prior art; the provision of such improved dynamoelectric machine, method and circuit in which both the starting torque and the running torque of the dynamoelectric machine is optimized; the provision of such improved dynamoelectric machine, method and circuit having both start and run capacitors which may be optimized for use with the dynamoelectric machine; the provision of such improved dynamoelectric machine, method and circuit having simplified means for controlling a winding circuit of the dynamoelectric machine; the provision of such improved dynamoelectric machine, method and circuit having a pair of auxiliary windings adapted for selective connection with a phase winding during the start and running modes of the dynamoelectric machine thereby to effect the optimization of both the starting and running torques of the dynamoelectric machine; the provision of such improved dynamoelectric machine having a low A ratio in the starting mode thereof and a high A ratio during the running mode thereof; and the provision of such improved dynamoelectric machine, method and circuit utilizing components which are simplistic in design, easily assembled and economically manufactured. These as well as other objects and advantageous features of the present invention will be in part apparent and in part pointed out hereinafter.

In general, a dynamoelectric machine in one form of the invention is adapted for energization in both a starting mode and a running mode across a source of power. The dynamoelectric machine has a stationary assembly and a rotatable assembly adapted to be associated in magnetic coupling relation with the stationary assembly upon the energization of the dynamoelectric machine across the power source. A winding circuit is associated with the stationary assembly and adapted to be connected across the power source upon the energization of the dynamoelectric machine. The winding circuit includes main winding means and phase winding means for connection in parallel circuit relation and a pair of auxiliary winding means adapted for selective connection in series circuit relation with the phase winding means during the starting mode and the running mode of the dynamoelectric machine, respectively. One of the auxiliary winding means is selectively connected in the series circuit relation with the phase winding means only during the starting mode of the dynamoelectric machine so that current flow through the one auxiliary winding means and the phase winding means creates respective opposing magnetic fields. The other of the auxiliary winding means is selectively connected in the series circuit relation with the phase winding only during the running mode of the dynamoelectric machine so that current flow through the other auxiliary winding means and the phase winding means create respective additive magnetic fields.

Further in general and in one form of the invention, a method is provided for operating a dynamoelectric machine in both starting and running modes across a power source with the dynamoelectric machine having a main winding, a phase winding, and a pair of auxiliary windings respectively associated with a ferromagnetic core of the dynamoelectric machine. In this method respective magnetic fields are established in bucking relation with each other by flowing current through the phase winding and only one of the auxiliary windings during the starting mode operation of the dynamoelectric machine across the power source, and then respective magnetic fields are created in aiding relation with each other by flowing current through the phase winding and only the other of the auxiliary windings during the running mode operation of the dynamoelectric machine across the power source.

Still further in general, a circuit in one form of the invention is adapted to be connected across a power source. In this circuit, a dynamoelectric machine includes a main winding, a phase winding arranged in parallel circuit relation with the main winding and having a common junction therewith adapted to be connected with one side of the power source, and a pair of auxiliary windings arranged in parallel circuit relation with each other and having a common junction with the phase winding. One of the auxiliary windings is arranged in bucking relation with the phase winding. A current relay includes a coil having first and second pairs of contacts and a coil connected with the main winding and one of the contacts of the first and second contact pair to the other side of the power source. The other of the contacts of the first and second contact pairs are respectively connected with the auxiliary windings. The current relay further includes switching means arranged in magnetic coupling relation with the coil and operable generally for making with one of the first and second contact pair and breaking from the other of the first and second contact pairs upon the energization of the dynamoelectric machine and the coil means across the power source. A capacitor is connected in circuit relation between at least one of the other contacts of the first and second contact pairs and at least one of the auxiliary windings, and means for selectively energizing the circuit is connected between one of the junctions between the main and phase winding and the one side of the power source and the connection of the one contact of the first and second contact pairs with the other side of the power source.

BRIEF DESCRIPTION OF THE DRAWINGS

Corresponding reference characters indicate corresponding parts throughout the several views of the drawings.

The exemplifications set out herein illustrate the preferred embodiments of the present invention in one form thereof, and such exemplifications are not to be construed as limiting the scope of the invention in any manner.

DETAILED DESCRIPTION OF THE PREFERRED EMBODIMENT

Figure 1:
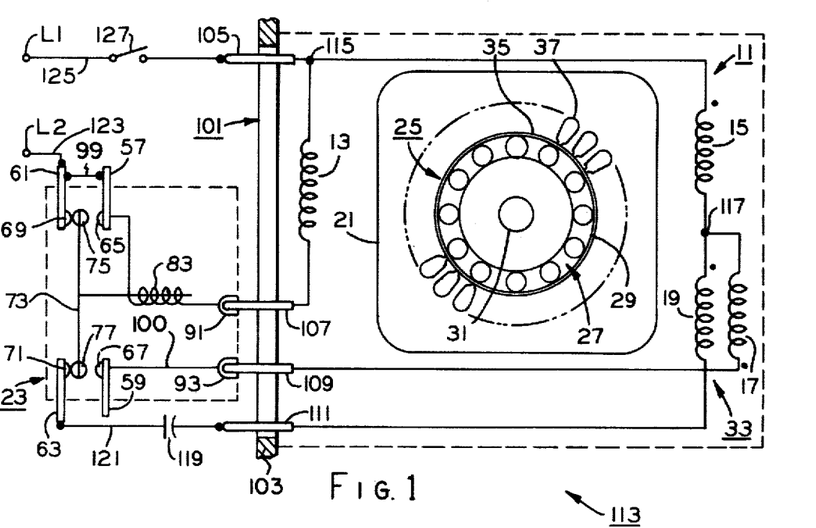
FIG. 1 is a schematic diagram of a circuit in one form of the invention having a dynamoelectric machine also in one form of the invention connected in such circuit and illustrating principles which may be practiced in a method of operating the dynamoelectric machine also in one form of the invention.

With reference now to the drawings in general, there is illustrated in one form of the invention a method of operating a dynamoelectric machine 11 in both starting and running modes thereof across a power source, indicated generally a pair of line or power terminals L1, L2 (FIG. 1). Dynamoelectric machine 11 may be, for instance, an electric motor of the resistance start capacitor run type phase motor, and the dynamoelectric machine or motor 11 is provided with a main winding or main winding means 13, a phase winding or phase winding means 15, and a pair of auxiliary windings or auxiliary winding means 17, 19 associated with or otherwise disposed on a ferromagnetic core 21 of the dynamoelectric machine (FIG. 1). In this method, respective magnetic fields are established in opposed or bucking relation with each other by flowing current through phase winding 15 and only one of auxiliary windings 17, 19 during the starting mode or operation of dynamoelectric machine 11 across power source L1, L2, and then respective magnetic fields are created in aiding relation with each other by flowing current through the phase winding and only the other of the auxiliary windings and the capacitor 119 during the running mode or operation of the dynamoelectric machine across the power source (FIG. 1).

Figures 2, 3:
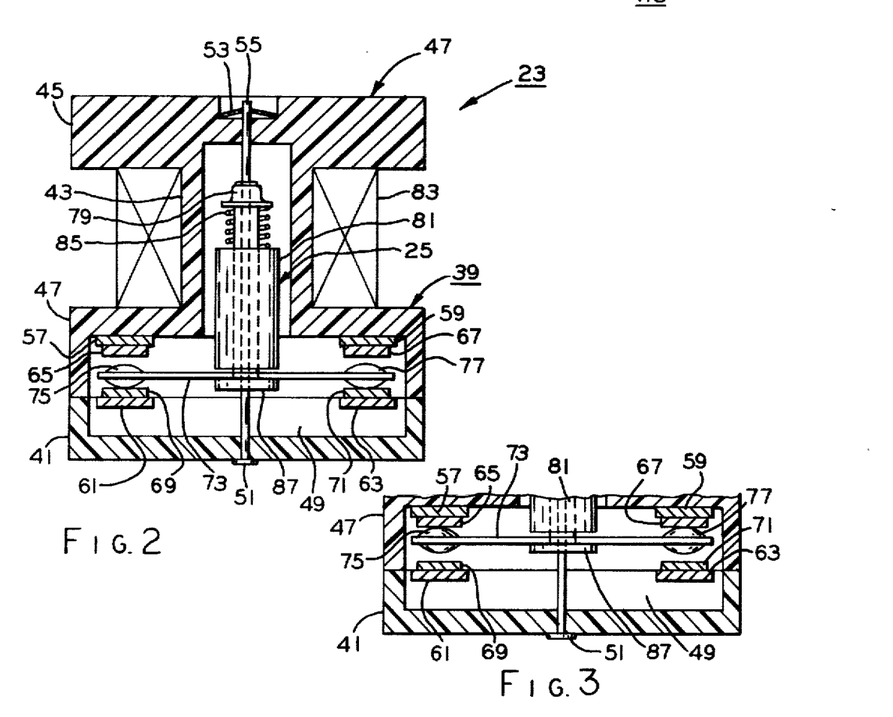
FIG. 2 is a diagrammatic sectional view of a current relay shown in the circuit of FIG. 1 and illustrating a switch member made between a contact pair thereof.
FIG. 3 is a partial view taken from FIG. 2 illustrating the switch member made between another contact pair of the current relay.
Figure 4:
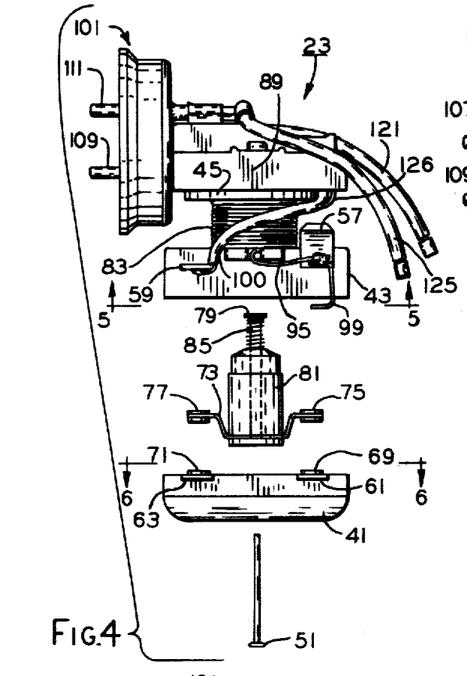
FIG. 4 is an elevational exploded view of the current relay of FIG. 2.
Figure 5:
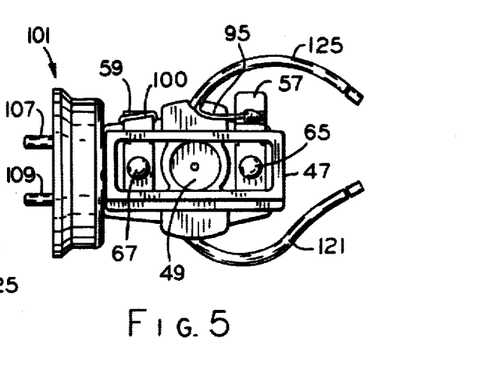
FIGS. 5 and 6 are sectional views taken along lines 5—5 and 6—6 of FIG. 4, respectively.
Figure 6:
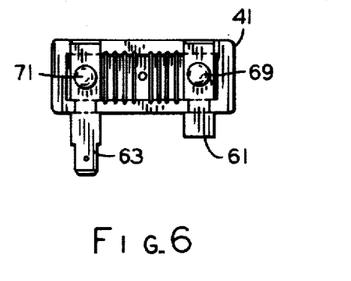
Figure 7:
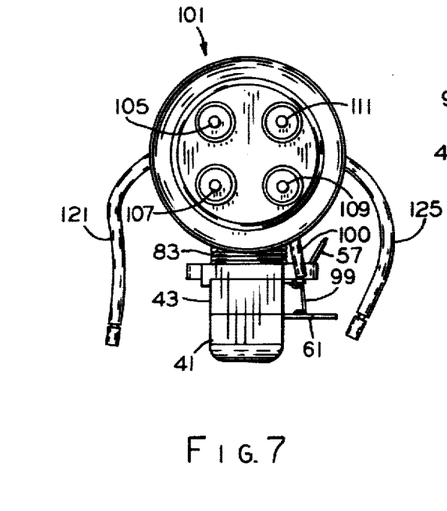
FIG. 7 is a left side elevational view taken from FIG. 4.

More particularly and with specific reference to FIGS. 1-3 and 8, a current relay 23 includes switch or switching means 25 of the double poly double throw type for instance, which is operable generally between a pair of switching or circuit completing positions (as best seen in FIGS. 2 and 3). When switching means 25 of relay 23 is in one switching position thereof illustrated in FIG. 3, phase winding 15 and auxiliary winding 17 are generally conjointly excited in parallel circuit relation across main winding 13 upon its excitation across power source L1, L2 to effect the energization of dynamelectric machine 11 in the starting mode or starting operation thereof. It may be noted that auxiliary winding 17 may be of the back-lash type having a plurality of conductor turns wound or otherwise disposed on ferromagnetic core 21 of dynamoelectric machine 11 in a direction generally opposite to the conductor turns of phase winding 15. Therefore, upon the starting mode energization of dynamoelectric machine 11 across power source L1, L2, the current flow through phase winding 15 and auxiliary winding 17 causes such windings to establish or otherwise create their respective magnetic fields in the opposing or bucking relation with each other. Of course, the magnetic effect of the reverse wound conductor turns of auxiliary winding 17 is essentially cancelled by corresponding forward wound conductor turns in phase winding 15. Thus, the resistance of phase winding 15 with respect to that of main winding 13 provides a current phase displacement therebetween to effect the energization or starting of dynamoelectric machine 11 in its starting mode. In view of the foregoing, it may be noted that the effective conductor turns of auxiliary winding 17 may be optimized or "tailored" with respect to those of phase winding 15 thereby to provide a preselected low "a" ratio between the phase winding and the auxiliary winding which is effective to optimize the starting torque of dynamoelectric machine 11 during the starting mode thereof. As well known in the art, the "a" ratio of a dynamoelectric machine at any given time is a function of the relative number of effective conductor turns in the main winding as compared with those in the auxiliary winding, i.e. as compared with the number of effective conductor turns in phase winding 15 and the one of auxiliary windings 17, 19 connected in circuit therewith in the present dynamoelectric machine 11. It may also be noted that when auxiliary winding 17 is connected by relay 23 so as to be excited in series circuit relation with phase winding 15, as discussed above, auxiliary winding 19 is electrically disassociated or otherwise disconnected from the phase winding so as to be generally ineffective during the starting mode of dynamoelectric machine 11. Although auxiliary winding 17 has been discussed hereinabove within the context of a back-lash type winding, it is contemplated that the conductor turns of auxiliary winding 17 may be wound or otherwise formed in the same direction as those of phase winding 15 but connected in series with the phase winding in a reverse manner so as to produce the aforementioned respective magnetic fields in the opposed or bucking relation with each other when dynamoelectric machine 11 is energized in its starting mode within the scope of the invention so as to meet the objects thereof.

When energized in its starting mode as discussed above, dynamoelectric machine 11 attains a preselected or predetermined speed which, of course, is generally definitive or indicative of the occurrence of its running mode, i.e., the transition of the dynamoelectric machine from its starting mode into its running mode or running operation. Generally as dynamoelectric machine 11 attains the preselected or running speed thereof, relay 23 senses the aforementioned transition between the starting and running modes of the dynamoelectric machine and effects the operation of switching means 25 from its switching position of FIG. 3 to the switching position thereof illustrated in FIG. 2, as discussed in greater detail hereinafter. With switching means 25 of relay 23 in its other switching position of FIG. 2, it may be noted that auxiliary winding 17 is electrically disassociated or otherwise disconnected from phase winding 15, and auxiliary winding 19 is now electrically connected in series circuit relation with the phase winding. Thus, phase winding 15 and auxiliary winding 19 are generally conjointly excited in parallel circuit relation across main winding 13 upon its excitation across power source L1, L2 to effect the energization of dynamoelectric machine 11 in the running mode thereof. It may also be noted that auxiliary winding 19 is provided with a plurality of conductor turns wound or otherwise disposed on ferromagnetic core 21 of dynamoelectric machine 11 in the same direction as the conductive turns of phase winding 15. Therefore, during the running mode energization of dynamoelectric machine 11, the current flow through phase winding 15 and auxiliary winding 17 causes such windings to establish or otherwise create their respective magnetic fields in an additive or aiding relation with each other. In view of the foregoing, it may be noted that the effective conductor turns of auxiliary winding 19 may be optimized or "tailored" with respect to those of phase winding 15 thereby to provide a preselected high "a" ratio between main winding 13 and the additive phase and auxiliary windings which is effective to optimize the running torque of dynamoelectric machine 11 during the running mode thereof.

Referring again to the drawings in general and recapitulating at least in part with respect to the foregoing, dynamoelectric machine 11 in one form of the invention is of a variable A ratio type adapted for energization in its starting mode and its running mode across power source L1, L2 (FIG. 1). Dynamoelectric machine 11 is provided with a stationary assembly comprising at least ferromagnetic or stator core 21, and a rotatable assembly 27 including at least a rotor 29 and a shaft 31, is adapted to be associated in magnetic coupling relation with ferromagnetic core 21 upon the energization of the dynamoelectric machine across power source L1, L2. A winding circuit 33 is associated with or otherwise disposed on ferromagnetic core 21 and is adapted to be connected across power source L1, L2 upon the energization of dynamoelectric machine 11. Winding circuit 33 includes main and phase windings 13, 15 for connection in parallel circuit relation, and auxiliary windings 17, 19 adapted for selective connection in series circuit relation with the phase winding during the starting mode and the running mode of dynamoelectric machine 11, respectively. Auxiliary winding 17 is selectively connected in the series circuit relation with phase winding 15 only during the starting mode of dynamoelectric machine 11 so that current flow through the phase winding and the auxiliary winding creates respective opposing or bucking magnetic fields. Auxiliary winding 19 is selectively connected in the series circuit relation with phase winding 15 only during the running mode of dynamoelectric machine 11 so that current flow through the phase winding and the auxiliary winding create respective additive or aiding magnetic fields.

More particularly and with specific reference to FIG. 1, ferromagnetic core 21 of dynamoelectric machine 11 is provided with a bore 35 in which rotor 29 is rotatably received, and the rotor may be of the typical squirrel cage type adapted for magnetic coupling relation with the core upon the excitation of winding circuit 33 of the dynamoelectric machine when it is energized across power source L1, L2. A plurality of winding slots 37 may be conventionally provided in core 21 intersecting with bore 35 thereof, and albeit not shown, main winding 13, phase winding 15 and auxiliary windings 17, 19 may be received or otherwise distributed in the winding slots in a desired manner well known in the art. It may be noted that relay 23 comprises a means connected in winding circuit 33 of dynamoelectric machine 11 for controlling the selective connection of auxiliary windings 17, 19 in the series circuit relation with phase winding 15 during the starting and running modes of the dynamoelectric machine, as discussed in greater detail hereinafter.

Relay 23, as generally schematically illustrated in FIGS. 2 and 3, is provided with a housing 39 having a plurality of housing portions molded or otherwise formed of suitable dielectric material, such as any suitable plastic for instance. The housing portions include a closure member 41 and a bobbin 43 having a pair of spaced apart, generally radially extending flanges or flange portions 45, 47 integrally formed therewith. In their assembled positions, closure member 41 and bobbin 43 define a switch means accommodating chamber 49 therein. A headed pin 51 extends through chamber 49, closure member 41 and flange 45 of bobbin 43, so as to retain the closure member in seating engagement against flange 47 of the bobbin, and a jam nut or washer 53 or the like is fixedly connected between a distal end 55 of the pin and flange 45 thereby to retain the closure member and bobbin against displacement from the assembled position thereof.

Switching means 25 of relay 23 includes a pair of sets of terminals 57, 59 and 61, 63 which extend through relay housing 47 and have supporting sections interiorly of chamber 57 to which a pair of sets of contacts 65, 67 and 69, 71 are respectively mounted, and the switching means further includes a bridge 73 which carries a pair of double contacts 75, 77 for making and breaking with contacts 65, 67 and 69, 71, respectively. Bridge 73 formed of suitable conductive material is carried adjacent the lower end of a sleeve 79 slidably movable on pin 51, and an armature means 81 is slidably received about the sleeve and predeterminately positioned so as to be coupled in magnetic relation with a coil means or relay coil 83 disposed on bobbin 51 when the coil is energized, as discussed hereinafter. Resilient means, such as a coil spring 85, is caged between armature 81 and the upper end of sleeve 79. Thus in the at-rest position of switching means 25, as best seen in FIG. 2, the weight of armature 81 acting on bridge 73 urges it into abutment with a hub 87 on the lower end of sleeve 79 and also urges double contacts 75, 77 on the bridge into making engagement with contacts 69, 71, respectively.

Figure 8:
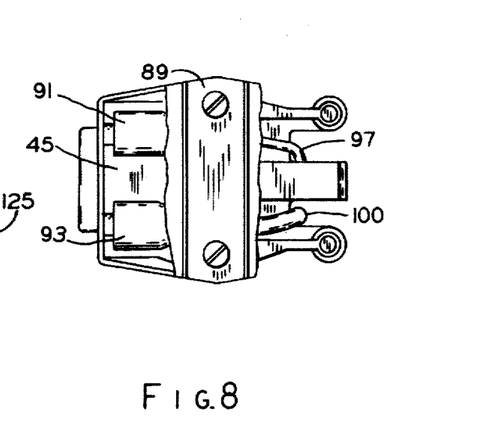
FIG. 8 is a partial plan view of the relay of FIG. 4 with a cover therefor partially broken away.

With reference now also to FIGS. 4–8 which illustrate the actual structure of relay 23, a receptacle portion or cover 89 is attached by suitable means in overlaying relation with upper flange 45 of bobbin 43, and at least a pair of female terminals or sockets 91, 93 are seated or otherwise retained against displacement between the upper flange and the cover in a manner well known to the art, as best seen in FIG. 8. If a more detailed discussion of the arrangement of female terminals 91, 93 with cover 89 and flange 45 of bobbin 43 is desired, reference may be had to U.S. Pat. No. 4,158,828, issued June 19, 1979 to Thomas J. Kindelspire which is incorporated herein by reference.

Coil 83 of relay 23 comprises a plurality of turns of dielectrically coated wire continuously wound about bobbin 43 between flanges 45, 47 thereof exteriorly of chamber 49 of relay 23, and one end or lead part 95 of the turn plurality of the coil is connected by suitable means, such as for instance soldering, crimping or the like, with female terminal 91 while the other end or lead part 97 of the turn plurality of the coil is connected by similar suitable means to the exterior end or electrical connector section of terminal. To complete the description of relay 23, a jumper or lead 99 is interposed between the electrical connector sections of terminals 57, 61 exteriorly of relay housing 39, a female terminal 93 is connected with the electrical connector section of terminal 59 by a lead 100.

A terminal cluster or assembly, such as a Fusite plug 101 or the like for instance, may be suitably mounted or otherwise secured in a jacket or housing 103 of an apparatus, such as a hermetic compressor or the like for instance (not shown) adapted to be driven by dynamoelectric machine 11, and the Fusite plug is provided with four conductive pins 105, 107, 109, 111 extending therethrough, as also shown schematically in FIG. 1.

In one form of the invention, a circuit, indicated generally at 113 in FIG. 1, includes winding circuit 33 of dynamoelectric machine 11 and relay 23 connected in circuit relation with Fusite plug 101, as discussed hereinafter. Main and phase windings 13, 15 in dynamoelectric machine winding circuit 33 have a common juncture at 115 which is connected to pin 105 of Fusite plug 101, and pin 107 thereof is connected with the other end of the main winding opposite common junction 115. Opposite to common junction 115, the other end of phase winding 15 defines another common junction 117 with both auxiliary windings 17, 19, and the other ends of the auxiliary windings opposite to common junction 117 are respectively connected with pins 109, 111 of Fusite plug 101. Thus, as previously mentioned, phase winding 15 is in parallel circuit relation with main winding 13 in dynamoelectric machine winding circuit 33, and the parallel arranged auxiliary windings 17, 19 are each connected in series circuit relation with phase winding 15.

When relay 23 is removably mounted in circuit relation onto Fusite plug 101, female terminals 91, 93 of the relay are respectively received in plug-on conductive relation with pins 107, 109 of Fusite plug 101, and a running capacitor 119 may be interposed in a lead 121 connected between pin 111 of the Fusite plug and terminal 63 of the relay. To complete the description of circuit 113, a lead 123 is connected between power terminal L2 and terminal 61 of relay 23, and another lead 125 having an on-off type switch 127 interposed therein is connected between power terminal L1 and pin 105 of Fusite plug 101.

In the operation of dynamoelectric machine 11 in circuit 113 with the components thereof disposed as shown in the drawings and as described hereinbefore, an operator may close on-off switch 127 thereby to make circuit 113 across power source L1, L2 placing the dynamoelectric machine in its starting mode so that main winding 13, phase winding 15 and auxiliary winding 17 are initially generally conjointly excited. Current flows from power terminal L1 though lead 125, main winding 13 and common juncture 115 of dynamoelectric machine winding circuit 33 between Fusite pins 105, 107 to female terminal 91 of relay 23 and therefrom through relay coil 83, terminals 57, 61 and jumper 99 of the relay to power terminal L2 through lead 123. Of course, upon the initial excitation of main winding 13, a generally high current draw is occasioned, and when such current draw excites coil 83 of relay 23 to a predetermined pick-up value therefor, a magnetic field established by the relay coil couples with armature 81 causing it to throw or rise (as best seen in FIGS. 2 and 3) upwardly against the compressive force of spring 85. Of course, the force exerted by the rising movement of armature 81 against spring 85 is translated therethrough to sleeve 79, and the sleeve rises on pin 51 generally conjointly with the rise of the armature. In this manner, bridge 73 is moved upwardly conjointly with sleeve 79 until double contacts 75, 77 on the bridge make with contacts 65, 67. With double contacts 75, 77 of bridge 73 so made with contacts 65, 67, auxiliary winding 17 is switched into series circuit relation with phase winding 15 of dynamoelectric machine winding circuit, and auxiliary winding 19 is, in effect, electrically disassociated or switched from the phase winding. Thus, current also flows from common junction 115 of dynamoelectric machine winding circuit through phase and auxiliary windings 15, 17 to Fusite pin 109 and therefrom through female teminal 93 of relay 23, lead 100, terminals 57, 59 through bridge 73, jumper 99 and terminal 61 to power terminal L2 through lead 123. Of course, the excitation of main winding 13 in the starting mode of dynamoelectric machine 11, as discussed above, is generally conjoint with the excitation of phase and auxiliary windings 15, 17 in parallel circuit relation with the main winding across power terminals L1, L2. As previously mentioned, the magnetic field produced by the larger phase winding 15 cancels the magnetic field produced by auxiliary winding 17 which is either wound or connected such that its magnetic field bucks that of the phase winding during the starting mode of dynamoelectric machine 11, and improved starting torque is believed to be achieved by forming auxiliary winding 17 with an optimum number of effective turns to produce a desired or preselected low "a" ratio for the dynamoelectric machine during its starting mode. Upon the above discussed starting mode energization of dynamoelectric machine 11, rotatable assembly 27 is rotatably driven in core 21 due to the magnetic coupling relation between rotatable assembly and main winding 13, phase winding 15 and auxiliary winding 17 of winding circuit 33 in ferromagnetic core 21 of the dynamoelectric machine.

Generally as rotatable assembly 27 attains its preselected speed so that dynamoelectric machine 11 is translated from its starting mode to its running mode, an appreciable reduction of the current draw by main winding 13 is occasioned, and in effect, this current draw reduction is sensed by relay coil 83. When the current draw is so reduced to the predetermined drop-out value of relay 23, the magnetic effect and excitation of relay coil 83 is correspondingly reduced. Thus, at this predetermined drop-out value of relay 23, the magnetic coupling between relay coil 83 and armature 81 is insufficient to hold the armature against the compressive force of spring 85 acting thereon. As a result, the compressive force of spring 85 drives the armature 81 in a downward direction (as best seen in FIGS. 2 and 3) against bridge 73 causing it to break its double contacts 75, 77 from contacts 65, 67 and then remake the double contacts with contacts 69, 71. With double contacts 75, 77 on bridge 73 so made with contacts 69, 71, auxiliary winding 17 is electrically disassociated or switched from circuit relation with phase winding 15, and auxiliary winding 19 is switched into series circuit relation with the phase winding. When phase and auxiliary windings 15, 19 and run capacitor 119 are so connected in series circuit relation in dynamoelectric machine winding circuit 31, dynamoelectric machine 11 is in its running mode. Thus, during the running mode of dynamoelectric machine 11, current flows from common junction 115 of the dynamoelectric machine winding circuit 33 through phase and auxiliary windings 15, 19 to Fusite pin 111 and therefrom through lead 121 and capacitor 119 to terminal 63 of relay 23. From terminal 63, the current flows through bridge 73 to terminal 61 and therefrom to power terminal L2 through lead 123. Of course, the excitation of main winding 13 in the running mode of dynamoelectric machine 11 is generally conjoint with the excitation of phase and auxiliary windings 15, 19 in parallel circuit relation with the main winding across power terminals L1, L2. As previously mentioned, the magnetic field produced by phase winding 15 is additive to the magnetic field produced by auxiliary winding 19 which is either wound or connected such that its magnetic field aids that of the phase winding during the running mode of dynamoelectric machine 11, and improved running torque is believed to be achieved by forming auxiliary winding 19 with optimum number of effective turns to produce a desired or preselected high "a" ratio for the dynamoelectric machine during its running mode.

From the foregoing, it is now apparent that a novel dynamoelectric machine 11, a method of operating such, and circuit 113 are presented meeting the objects and advantageous features set out hereinbefore, as well as others, and it is contemplated that changes to the precise arrangements, shapes, details and connections of the components illustrated herein by way of disclosure, as well as the precise order of the steps of the illustrated method, may be made by those having ordinary skill in the art without departing from the spirit of the invention or the scope thereof as set out by the claims which follows.

What I claim as new and desire to secure by Letters Patent of the United States is:

1. A dynamoelectric machine adapted for energization in both a starting mode and a running mode across a source of power, the dynamoelectric machine comprising:
   a stationary assembly;
   a rotatable assembly adapted to be associated in magnetic coupling relation with said stationary assembly upon the energization of the dynamoelectric machine across the power source; and
   a winding circuit associated with said stationary assembly and adapted to be connected across the power source upon the energization of the dynamoelectric machine, said winding circuit including main winding means and phase winding means for connection in parallel circuit relation, and a pair of auxiliary winding means adapted for selective connection in series circuit relation with said phase winding means during the starting mode and the running mode of the dynamoelectric machine, respectively, one of said auxiliary winding means being selectively connected in the series circuit relation with said phase winding means only during the starting mode of the dynamoelectric machine so that current flow through said one auxiliary winding means and said phase winding means creates respective opposing magnetic fields, and the other of said auxiliary winding means being selectively connected in the series circuit relation with said phase winding only during the running mode of the dynamoelectric machine so that current flow through said other auxiliary winding means and said phase winding means create respective additive magnetic fields.

2. A dynamoelectric machine adapted for energization in both a starting mode and a running mode across a single phase power source, the dynamoelectric machine comprising:
   a ferromagnetic core;
   a main winding, a phase winding, a first auxiliary winding and a second auxiliary winding disposed on said ferromagnetic core and adapted for connection to the power source; and
   switch means for establishing a series connection between said phase winding and said first auxiliary winding during the starting mode of the dynamoelectric machine such that current flow through said first auxiliary winding establishes a magnetic field that opposes a magnetic field generally simultaneously established by current flow through said phase winding and for alternatively establishing a series connection between said phase winding and said second auxiliary winding during the running mode of the dynamoelectric machine such that current flow through said second auxiliary winding establishes a magnetic field that is additive to a magnetic field generally simultaneously established by current flow through the phase winding, said switch means being adapted for interrupting the series connection between said phase and second auxiliary windings during the starting mode of the dynamoelectric machine and for interrupting the series connection between said phase and first auxiliary windings during the running mode of the dynamoelectric machine.

3. The dynamoelectric machine as set forth in claim 2 wherein the series connection of said phase and first auxiliary windings and the series connection of said phase and second auxiliary windings are connected in parallel with said main winding.

4. The dynamoelectric machine as set forth in claim 2 further comprising a capacitive element connected in series with said second auxiliary winding and said phase winding during the running mode of the dynamoelectric machine.

5. The dynamoelectric machine as set forth in claim 2 wherein said switch means comprises a current relay having a first pair of contact means for connection in series with said first auxiliary winding, a second pair of contact means for connection in series with said second auxiliary winding, and means operable generally for sensing the occurrence of a preselected current condition associated with said main winding to open one of said first and second contact means pairs and close the other of said first and second contact means pair generally as the dynamoelectric machine attains a preselected running speed therefor.

6. The dynamoelectric machine as set forth in claim 5 wherein said sensing means opens said first contact means pair and closes said second contact means pair.

7. The dynamoelectric machine as set forth in claim 6 further comprising a run capacitor connected in series with said second auxiliary winding and said second contact means pair during the running mode of the dynamoelectric machine.

8. The dynamoelectric machine as set forth in claim 5 wherein said sensing means comprises a coil connected in series with said main winding.

9. The dynamoelectric machine as set forth in claim 2 wherein said phase winding and said second auxiliary winding are forward wound windings and said first auxiliary winding is a reverse wound winding.

10. A dynamoelectric machine adapted to be energized across a power source comprising:

a ferromagnetic core;

a pair of terminals adapted for connection with the power source;

a main winding comprising forward wound turns disposed on said ferromagnetic core;

a current relay including a pair of normally open contacts, a pair of normally closed contacts, and a coil in series with said main winding, said main winding and relay coil being connected across said terminals;

a phase winding comprising forward wound turns disposed on said ferromagnetic core;

a first auxiliary winding disposed on said ferromagnetic core and connected in series with said phase winding, said first auxiliary winding comprising reverse wound turns wound in a direction that is opposite the direction in which the turns of said phase winding are wound such that current flowing through the series connection of said phase and auxiliary windings establishes respective magnetic fields that are in bucking relation, said phase winding, said first auxiliary winding, and said normally open contacts being connected in series across said terminals and in parallel with said main winding and said relay coil; and a second auxiliary winding disposed in said ferromagnetic core and connected in series with said phase winding and said normally closed contacts across said terminals, said second auxiliary winding and said normally closed contacts being connected in parallel with said first auxiliary winding and said normally open contacts, said second auxiliary winding comprising forward wound turns wound in the same direction as the turns of the phase winding such that current flowing through the series connection of said phase and second auxiliary windings establishes respective magnetic fields that are in aiding relationship.

11. The dynamoelectric machine as set forth in claim 10 further comprising a capacitive element connected in series with said second auxiliary winding and said normally closed contacts.

12. The dynamoelectric machine as set forth in claim 10 wherein said second auxiliary winding is connected to a common junction point between said phase winding and said first auxiliary winding.

13. The dynamoelectric machine as set forth in claim 10 wherein said relay further includes an armature arranged with said coil so that a magnetic field produced thereby during a start mode of the dynamoelectric machine actuates said armature to a first position, an electrically conductive bridge connected to said armature, said bridge in its first position being arranged in making engagement with said normally open contacts, and means for biasing said armature and bridge to a second position, said bridge in its second position being arranged in making engagement with said normally closed contacts.

14. The dynamoelectric machine as set forth in claim 13 wherein said biasing means comprises a spring.

15. A dynamoelectric machine adapted to be energized across a power source comprising:

a ferromagnetic core;

a pair of terminals adapted for connection with the power source;

a main winding disposed on said ferromagnetic core;

a phase winding disposed on said ferromagnetic core;

a first auxiliary winding disposed on said ferromagnetic core;

a second auxiliary winding disposed on said ferromagnetic core;

switch means for establishing a series connection between said phase and first auxiliary windings across said terminals during a starting mode of the dynamoelectric machine such that current flow through the series connected phase and first auxiliary windings establishes respective magnetic fields that oppose each other and for alternatively establishing a series connection between said phase and second auxiliary windings across said terminals during a running mode of the dynamoelectric machine such that current flow through the series connected phase and second auxiliary windings establishes respective magnetic fields that aid each other, said switch means including a housing, an electrically conductive bridge movably mounted in said housing, means for sensing a preselected condition of the dynamoelectric machine upon the energization thereof and moving said armature and bridge to a starting mode position and an alternative running mode position depending on the sensed preselected condition, two first contact elements positioned such that they are contacted by said bridge when said bridge is in its starting mode position, said first contact elements and said bridge being connected in series with said phase and first auxiliary windings when said arm is in its starting mode position, two second contact elements positioned such that they are contacted by said bridge when bridge is in its running mode position, said second contact elements and said bridge being connected in series with said phase and second auxiliary windings when said bridge is in its running mode position.

16. A method of operating a single phase induction motor having a main winding connected to a voltage source, a phase winding, a first auxiliary winding and a second auxiliary winding all disposed on a ferromagnetic core, the method comprising:

on starting of the motor, connecting the phase and first auxiliary windings to the voltage source and in series with each other to flow current simultaneously through the phase and first auxiliary windings in respective directions such that respective magnetic fields are established by the phase and first auxiliary windings which are in bucking relation to each other, the second auxiliary winding being electrically disconnected from the motor during starting of the motor; and subsequently, during the run condition of the motor, electrically disconnecting the first auxiliary winding from the motor and connecting the phase and second auxiliary windings to the voltage source and in series with each other to flow current simultaneously through the phase and second auxiliary windings in respective directions such that respective magnetic fields are established by the phase and second auxiliary windings which are in aiding relationship to each other.

17. The method as set forth in claim 16 comprising the intermediate step of sensing the flow of current through the main winding and disconnecting the first auxiliary winding and connecting the second auxiliary winding, respectively, when the current through the main winding drops to a predetermined level.

18. A method of operating a dynamoelectric machine in both starting and running modes across a power source with the dynamoelectric machine having a main winding, a phase winding connected in parallel with the main winding, and a pair of auxiliary windings each connected in series circuit relation with the phase winding, the method comprising:

establishing respective magnetic fields in bucking relation with each other by flowing current through the phase winding and only one of the auxiliary windings during the starting mode operation of the dynamoelectric machine across the power source and then creating respective magnetic fields in aiding relation with each other by flowing current through the phase winding and only the other of the auxiliary windings during the running mode operation of the dynamoelectric machine across the power source.

19. The method as set forth in claim 18 wherein the establishing and creating step includes switching the other auxiliary from circuit relation with the phase windings during the starting mode of the dynamoelectric machine.

20. The method as set forth in claim 18 wherein the establishing and creating step includes switching the one auxiliary winding from circuit relation with the phase winding during the running mode of the dynamoelectric machine.

21. The method as set forth in claim 18 wherein the establishing and creating step includes sensing the occurrence of a preselected condition associated with the current flow through the main winding of the dynamoelectric machine to effect the transition of the dynamoelectric machine energization from the starting mode to the running mode.

22. The method as set forth in claim 18 wherein the establishing and creating step includes energizing a capacitor element in series circuit relation with the phase winding and the other auxiliary winding during the running mode of the dynamoelectric machine.

23. A circuit adapted to be connected across a power source comprising:

a dynamoelectric machine including a main winding, a phase winding arranged in parallel circuit relation with said main winding and having a common junction therewith adapted to be connected with one side of the power source, and a pair of auxiliary windings arranged in parallel circuit relation with each other and having a common junction with said phase winding, one of said auxiliary windings being arranged in bucking relation with said phase winding;

a current relay including first and second pairs of contacts, a coil connected with said main winding and one of said contacts of said first and second contact pairs to the other side of the power source, the other of said contacts of said first and second contact pairs being respectively connected with said auxiliary windings, and switching means arranged in magnetic coupling relation with said coil and operable generally for making one of said first and second contact pair and breaking the other of said first and second contact pairs upon the excitation of said coil means across the power source;

a capacitor connected in circuit relation between at least one of said other contacts of said first and second contact pairs and one of said auxiliary windings; and     means for selectively energizing the circuit across the power source.

* * * * *